3,158,650
HERBICIDAL N-SUBSTITUTED ARYLIMIDES
Edward David Weil, Lewiston, and Jerome Linder, Niagara Falls, N.Y., assignors to Hooker Chemical Corporation, Niagara Falls, N.Y., a corporation of New York
No Drawing. Filed May 25, 1961, Ser. No. 112,528
10 Claims. (Cl. 260—562)

This invention describes new and useful imide compositions of matter which have valuable herbicidal properties.

More particularly, this invention relates to novel N-substituted arylimides having phytotoxicity against various broadleaf weeds and annual grass. These compositions have the structure:

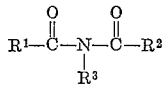

wherein $R^1$ is a saturated or unsaturated alpha methyl substituted aliphatic radical of from two to five carbon atoms having at least one methyl group on the alpha-carbon atom, and $R^2$ is chosen from the group consisting of hydrogen and saturated or unsaturated aliphatic radicals of from one to three carbon atoms, and $R^3$ is a chlorinated aryl radical chosen from the group consisting of 3,4-dichlorophenyl and 3-chloro-4-methylphenyl. The compounds of the invention are colorless oils or low-melting solids.

Representative examples of the compounds of this invention are

N-formyl-N-propionyl-3,4-dichloroaniline,
N-formyl-N-isobutyryl-3,4-dichloroaniline,
N-formyl-N-methacrylyl-3,4-dichloroaniline,
N-acetyl-N-propionyl-3,4-dichloroaniline,
N-acetyl-N-propionyl-3-chloro-4-methylaniline,
N-acetyl-N-propionyl-3,4-dichloroaniline,
N-(3,4-dichlorophenyl)propionimide,
N-(3-chloro-4-methylphenyl)propionimide,
N-(3,4-dichlorophenyl)isobutyrimide,
N-(3-chloro-4-methylphenyl)isobutyrimide,
N-(3,4-dichlorophenyl)methacrylimide,
N-(3-chloro-4-methylphenyl)methacrylimide,
N-acetyl-N-methacrylyl-3,4-dichloroaniline,
N-acetyl-N-methacrylyl-3-chloro-4-methylaniline,
N-acetyl-(2-methylpentanoyl)-3,4-dichloroaniline,
N-acetyl-N-(2-methylpentanoyl)-3-chloro-4-methylaniline,
N-3,4-dichlorophenyl-2-methylbutyrimide,
N-(3-chloro-4-methylphenyl)-2-methylbutyrimide,
N-acetyl-N-(2-methylbutyryl)-3,4-dichloroaniline,
N-acetyl-N-(2-methylbutyryl)-3-chloro-4-methylaniline,
N-n-butyryl-N-propionyl-3,4-dichloroaniline,
N-n-butyryl-N-propionyl-3-chloro-4-methylaniline,
N-n-butyryl-N-isobutyryl-3,4-dichloroaniline,
N-n-butyryl-N-isobutyryl-3-chloro-4-methylaniline,
N-n-butyryl-N-methacrylyl-3,4-dichloroaniline,
N-n-butyryl-N-methylacrylyl-3-chloro-4-methylaniline,
N-n-butyryl-N-2-methylpentanoyl-3,4-dichloroaniline,
N-n-butyryl-N-2-methylpentanoyl-3-chloro-4-methylaniline,
N-caproyl-N-propionyl-3,4-dichloroaniline,
N-caproyl-N-isobutyryl-3,4-dichloroaniline,
N-caproyl-N-methacrylyl-3,4-dichloroaniline,
N-crotonyl-N-propionyl-3,4-dichloroaniline,
N-crotonyl-N-isobutyryl-3,4-dichloroaniline,
N-crotonyl-N-methacrylyl-3,4-dichloroaniline,
N-2-ethylhexoyl-N-propionyl-3,4-dichloroaniline,
N-2-ethylhexoyl-N-isobutyryl-3,4-dichloroaniline,
N-2-ethylhexoyl-N-methacrylyl-3,4-dichloroaniline,
N-capryl-N-propionyl-3,4-dichloroaniline,
N-capryl-N-isobutyryl-3,4-dichloroaniline,
N-capryl-N-methacrylyl-3,4-dichloroaniline,
N-caprylyl-N-propionyl-3,4-dichloroaniline,
N-caprylyl-N-isobutyryl-3,4-dichloroaniline,
N-caprylyl-N-methacrylyl-3,4-dichloroaniline,
N-caprylyl-N-2-methylpentanoyl-3-chloro-4-methylaniline.

The preferred species are those in which $R^2$ is acetyl or n-butyryl, for reasons of cost in relation to activity.

The novel compounds of this invention are especially advantageous compared to many herbicides of the prior art (for example 2,4-D), in that they are substantially non-injurious to commercially valuable crops and turf grasses at rates of application (about one-half to ten pounds per acre), where they exert a pronounced phytotoxic effect against broadleaf perennial weeds and annual grasses. Examples of commercially important crops on which these novel imide compositions may be beneficially used without consequential injury to the crops are among other, rice, corn, carrots, potatoes, tobacco, pineapple, cotton, as well as the aforementioned desirable perennial turf grasses.

The method of the invention comprises spraying the compounds of the invention, most conveniently as an emulsion in water by the aid of an organic solvent and emulsifier, onto the weed seedlings to be killed. Rates of one-half to ten pounds of toxicant per acre are preferred, the exact rates preferable in any given situation depending on weeds species, stage of growth, vigor, degree of kill required, and other factors which will be obvious to those skilled in the art.

The compounds of the invention may be employed in combination with other herbicides and with fungicides, insecticides, growth stimulants, and fertilizers if desired. Their action may be enhanced by suitable choice of solvents, wetting agents, penetrating agents, spreaders, stickers and synergists. The use of the commercial spray additives known collectively as "spreader-stickers" is particularly to be recommended with these compounds.

The novel imides of this invention are generally made by heating stoichiometric amounts of the appropriately substituted acid chloride and the anilide or aniline until the proper number of molar equivalents of hydrogen chloride is evolved. For example, where $R^1$ and $R^2$ are the same the compounds are conveniently made by the prolonged heating of $R^3NH_2$ with two moles of $R^1COCl$ until two molar equivalents of hydrogen chloride are evolved. In those instances where $R^1$ and $R^2$ are different, the novel products are made by the extended heating of $R^1COCl$ with $R^2CONHR^3$ or $R^2COCl$ with $R^1CONHR^3$ until one molar equivalent of hydrogen chloride is given off. Where $R^2$ is hydrogen, HCOOH may be used instead of the non-existant HCOCl. Since the compounds are destined for use as herbicides they are frequently used as crudes, whose identity is confirmed by infrared and ultraviolet spectra. However, where desired, the products may be fractionally crystallized from solvents such as aliphatic hydrocarbons, aliphatic alcohols and ketones or the like, using distillation or absorption where desired to remove stubborn contaminants. No solvent is necessary, although if desired, or convenient, an inert solvent such as an aromatic hydrocarbon, a chlorocarbon or a chlorohydrocarbon or nitroaromatic solvent may be expeditiously used. The reaction is operable at temperatures ranging from seventy to two hundred and fifty degrees, although the most favorable temperatures appear to be from one hundred to two hundred degrees centigrade. Obviously, the reaction time being a function of the reactants and temperature cannot be stated with precision, but the extreme limits of time are between one hour to seventy-two hours, with the interval of four to eighteen hours being a more usual figure. Where the lower temperatures are used, the reaction time under given conditions, will approach the longer reaction times, while at higher temperatures, the converse will usually be true. An HCl acceptor such as pyridine is often useful in accelerating the reaction and permitting lower reaction temperatures, but not essential to operable conditions and satisfactory yields. The process of preparation and use of these novel compositions are given in the examples which follow. These further examples being merely illustrative of the workings of this invention, are not to be construed as limiting the specification or claims in any manner whatsoever.

*Example 1.—N-(3,4-Dichlorophenylpropionimide)*

A solution consisting of 32.4 parts of 3,4-dichloroaniline, forty-seven parts of propionyl chloride and four hundred parts of cumene is heated at reflux until 14.6 parts of gaseous hydrochloric acid evolves. The cumene is distilled off leaving an oil which on crystallization from hexane gives thirty-five parts of a white solid melting at sixty-eight to seventy degrees centigrade.

Analysis.—Calcd. for $C_{12}H_{13}Cl_2NO_2$: Cl, 25.9 percent; N, 5.1 percent. Found: Cl, 25.1 percent; N, 4.6 percent.

*Example 2.—N-Acetyl-N-Propionyl-3,4-Dichloroaniline*

A solution consisting of one hundred and two parts of 3,4-dichloroacetanilide, sixty-five parts of propionyl chloride and five hundred parts of cumene is heated to reflux until 18.2 parts of gaseous hydrochloric acid evolves. The cumene is distilled off leaving an oil which on crystallization from hexane gives a white solid melting at sixty to sixty-five degrees centigrade.

Analysis.—Calcd. for $C_{11}H_{11}Cl_2NO_2$: Cl, 27.3 percent; N, 5.3 percent. Found: Cl 27.6 percent; N, 4.5 percent.

*Examples 3–18*

Using the same techniques and equipment the following examples show representative products that are prepared from the reactants as indicated. Physical characteristics and elemental analysis established the formation of the desired products in each case. Included in the following list are some compounds related to, but not included in, the class of compounds of the invention. These are included for comparison purposes. See Table I.

*Herbicidal Activity of Compounds of Examples 1–18*

The compounds were dissolved in a mixture of 1:1 xylene-isophorone and emulsified in water with the help of a commercial polyoxyethylene sorbitan laurate-alkylaryl sulfonate emulsifier. They are sprayed at four pounds of herbicide per acre on a mixed population of seedlings of broadleaf weeds (principally lambsquarters, pigweed, ragweed, and mustard), and a mixed population of grassy weeds, (principally crabgrass, barnyard grass, cheatgrass and millet). After one week, the effect of the herbicides was evaluated. See Table II.

*Table I*

| Compound No. | $R_1$ | $R_2$ | $R_3$ | M.P., °C. | Cl Calcd. | Cl Found | N Calcd. | N Found |
|---|---|---|---|---|---|---|---|---|
| 1 | $-C_2H_5$ | $-C_2H_5$ | 3,4-dichlorophenyl | 68–70 | 25.9 | 25.1 | 5.1 | 4.6 |
| 2 | $-C_2H_5$ | $-CH_3$ | do | 60–5 | 27.3 | 27.6 | 5.3 | 4.5 |
| 3 | $-CH(CH_3)_2$ | $-CH(CH_3)_2$ | do | 75–6 | 23.5 | 23.5 | 4.6 | 3.9 |
| 4 | $-CH_3$ | $-CH_3$ | do | 78–80 | 28.8 | 29.1 | 5.7 | 5.8 |
| 5 | $n-C_3H_7$ | $n-C_3H_7$ | do | Oil | 23.5 | 23.3 | 4.6 | 4.1 |
| 6 | $-\underset{CH_3}{C}=CH_2$ | $-\underset{CH_3}{C}=CH_2$ | do | Oil | 23.8 | 23.1 | 4.7 | 4.2 |
| 7 | $-CH(CH_3)(C_3H_7)$ | $-CH(CH_3)(C_3H_7)$ | do | Oil | 19.9 | 19.2 | 3.93 | 3.4 |
| 8 | $-\underset{CH_3}{C}=CH_2$ | $-CH_3$ | do | Oil | 26.1 | 25.9 | 5.15 | 5.0 |
| 9 | $-CH(CH_3)(C_3H_7)$ | $-CH_3$ | do | Oil | 23.5 | 23.2 | 4.64 | 4.25 |
| 10 | $-C_2H_5$ | $-C_2H_5$ | 4-chlorophenyl | 45–6.5 | 14.6 | 14.6 | 5.85 | 5.32 |
| 11 | $-C_2H_5$ | $-C_2H_5$ | 3-chlorophenyl | 41–2 | 14.6 | 14.2 | 5.85 | 5.51 |
| 12 | $-C_2H_5$ | $-C_2H_5$ | 3-chloro-4-methylphenyl | 36–7 | 14.0 | 14.2 | 5.60 | 5.50 |
| 13 | $-CH(CH_3)(C_3H_7)$ | $-CH_3$ | do | Oil | 14.2 | 14.0 | 5.85 | 5.43 |
| 14 | $-C_2H_5$ | $-CH_3$ | do | Oil | 14.8 | 14.2 | 5.85 | 5.30 |
| 15 | $-\underset{CH_3}{C}=CH_2$ | $-CH_3$ | do | Oil | 12.6 | 12.1 | 4.99 | 4.30 |
| 16 | $-\underset{CH_3}{C}=CH_2$ | $-C_3H_7$ | 3,4-dichlorophenyl | Oil | 23.6 | 23.8 | 4.66 | 4.90 |
| 17 | $-C_2H_5$ | $n-C_3H_7$ | do | Oil | 24.6 | 24.2 | 4.86 | 4.30 |
| 18 | $-C_2H_5$ | $n-C_7H_{15}$ | do | Oil | 20.7 | 20.2 | 4.07 | 3.90 |

Table II

| Cpd. No. | Action on Broadleaf Species | Action on Grassy Species |
|---|---|---|
| 1 | A | A |
| 2 | A | B+ |
| 3 | A | A |
| 4 | C | C |
| 5 | C | C |
| 6 | A | A |
| 7 | B+ | B+ |
| 8 | A | A |
| 9 | B+ | B |
| 10 | C | C |
| 11 | C | C |
| 12 | B | B |
| 13 | B+ | B+ |
| 14 | A | A |
| 15 | A | B |
| 16 | A | A |
| 17 | A | A |
| 18 | B+ | B |

Scale:
A=70-100% kill (satisfactory control).
B=30-70% kill (fair control).
C=0-30% kill (essentially no control).

The compounds one to eighteen were sprayed on one-month old stands of field corn, carrots, potatoes, and rice at four pounds per acre. After one week inspection of these crops indicated no substantial injury, whereas weed seedlings of ragweed, pigweed, foxtail and cheatgrass present at the time of spraying were killed.

We claim:
1. An N-substituted arylimide having the structure

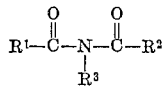

wherein $R^1$ is a monovalent radical selected from the group consisting of alkyl and alkenyl of two to five carbon atoms, said radical being branched with a methyl group at the alpha carbon thereof when it is of three to five carbon atoms, $R^2$ is selected from the group consisting of hydrogen, alkyl and alkenyl of from one to nine carbon atoms, and $R^3$ is selected from the group consisting of 3-chloro-4-methylphenyl and 3,4-dichlorophenyl.
2. N-acetyl-N-propionyl-3,4-dichloroaniline.
3. N-n-butyryl-N-propionyl-3,4-dichloroaniline.
4. N-acetyl-N-isobutyryl-3,4-dichloroaniline.
5. N-n-butyryl-N-isobutyryl-3,4-dichloroaniline.
6. N-acetyl-N-methacrylyl-3,4-dichloroaniline.
7. N-n-butyryl-N-methacrylyl-3,4-dichloroaniline.
8. N-(3,4-dichlorophenyl)propionimide.
9. N-(3,4-dichlorophenyl)isobutyrimide.
10. N-(3,4-dichlorophenyl)methacrylimide.

References Cited in the file of this patent

UNITED STATES PATENTS

| | | |
|---|---|---|
| 2,226,672 | Smith | Dec. 31, 1949 |
| 2,648,621 | Gerjovich et al. | Aug. 11, 1953 |
| 2,929,844 | Surrey | Mar. 22, 1960 |
| 2,977,212 | Tischler | Mar. 28, 1961 |
| 2,983,755 | Kollonitsch et al. | May 9, 1961 |
| 2,992,091 | Harmon et al. | July 11, 1961 |

FOREIGN PATENTS

| | | |
|---|---|---|
| 1,039,779 | Germany | Sept. 25, 1958 |

OTHER REFERENCES

Gertler et al.: U.S. Dept. of Agriculture, Agriculture Research Svc., ARS-33-14, pp. 1-12, pp. 4, 5 and 10 relied on (1955).